United States Patent
Lu et al.

(10) Patent No.: US 10,089,198 B1
(45) Date of Patent: Oct. 2, 2018

(54) DATA STORAGE SYSTEM WITH ACTIVE-STANDBY SYSTEM MANAGEMENT

(71) Applicant: EMC IP Holding Company LLC, Hopkinton, MA (US)

(72) Inventors: Binhua Lu, Shanghai (CN); Dazhi Dong, Shanghai (CN); Chen Zhang, Shanghai (CN); Chaoming Liu, Suzhou (CN); Peter Wang, Shanghai (CN); Norman Speciner, Medway, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 127 days.

(21) Appl. No.: 15/279,496

(22) Filed: Sep. 29, 2016

(51) Int. Cl.
*G06F 11/00* (2006.01)
*G06F 11/20* (2006.01)
*G06F 11/14* (2006.01)

(52) U.S. Cl.
CPC ........ *G06F 11/203* (2013.01); *G06F 11/1451* (2013.01); *G06F 2201/80* (2013.01); *G06F 2201/805* (2013.01); *G06F 2201/82* (2013.01); *G06F 2201/84* (2013.01)

(58) Field of Classification Search
CPC ............... G06F 11/203; G06F 11/1451; G06F 2201/84; G06F 2201/82; G06F 2201/80; G06F 2201/805
USPC ........................................................ 714/4.12
See application file for complete search history.

(56) References Cited

U.S. PATENT DOCUMENTS

| | | | |
|---|---|---|---|
| 7,668,981 B1* | 2/2010 | Nagineni | H04L 41/0896 710/15 |
| 9,092,396 B2 | 7/2015 | Fujieda | |
| 9,983,816 B1* | 5/2018 | Cao | G06F 3/0625 |
| 10,003,647 B2* | 6/2018 | McCabe | H04L 67/1095 |
| 2004/0128163 A1* | 7/2004 | Goodman | G06Q 10/10 705/2 |
| 2006/0168192 A1* | 7/2006 | Sharma | G06F 11/2028 709/224 |
| 2006/0242380 A1* | 10/2006 | Korgaonkar | G06F 3/0608 711/170 |
| 2010/0040205 A1 | 2/2010 | Amidi | |
| 2016/0165463 A1* | 6/2016 | Zhang | H04L 43/10 370/218 |
| 2017/0060918 A1* | 3/2017 | Iyer | G06F 21/6218 |

* cited by examiner

*Primary Examiner* — Yair Leibovich
(74) *Attorney, Agent, or Firm* — BainwoodHuang

(57) ABSTRACT

A data storage system includes storage processors that execute respective datapath components and management components. The datapath components maintain logical storage objects being the target of the storage I/O commands and for which underlying data is stored on an array of storage devices. The management components operate in an active-standby fashion in which (1) the management components maintain respective separate copies of a management database storing information about the logical storage objects, (2) an active management component serves external requests from a storage administrator by accessing its copy of the management database, and (3) a standby management component responds to non-availability of the first management component by becoming the active management component and serving subsequent external requests from the storage administrator by accessing its copy of the management database. Failover speed is increased due to the standby management component maintaining a current copy of the management database.

16 Claims, 3 Drawing Sheets

DATA STORAGE SYSTEM WITH ACTIVE-STANDBY SYSTEM MANAGEMENT

BACKGROUND

The invention is related to the field of data storage systems used in data processing systems, and in particular to data storage systems having internal system management components including a system management database.

SUMMARY

Data storage systems may incorporate two or more relatively independent processing complexes, referred to herein as "storage processors" or SPs. In one arrangement, the SPs of a data storage system may implement an active-standby approach with respect to system management functionality of the storage system. Normally during operation, only the active SP is involved in accepting and responding to system management commands from an external storage administrator, and maintains an internal management database for storing all management-related information. The standby SP does not execute the system management application, or "stack". The database may be stored on shared storage (e.g., a shared disk drive) so that the standby SP can connect to the database and use it upon a failover when the standby SP becomes active. However, the database is only accessed by the one active SP at a given time. As a result, the time required to fully complete a failover to a new active SP (formerly standby) may be undesirably long. The standby SP must start up the management stack, connect to the management database, and perform various initiation tasks before it is ready to respond to system management commands/requests. The time between failure of an active SP to readiness of a new active SP is a "blackout period" during which the data storage system is unable to respond to system management commands. With the complexity of modern data storage systems and their significant quantity of management information, the blackout period might be unacceptably long.

Generally, the present disclosure is directed to the arrangement and functioning of the management stack in a multi-SP data storage system. The description is given with reference to an example two-SP system, but the technique can be extended to a greater number of SPs as will be apparent to those skilled in the art. Separate copies of the management database are maintained on each SP, and the management stack is executed on both SPs. However, only one SP (active) actually serves external requests from a storage administrator. The management stack on both SPs utilizes event-driven messaging software to communicate with data path components, avoiding heavy polling activities. When the two SPs start up, both of the management stacks subscribe to messaging peers in the data path, and populate their own copy of the database from a first full poll data of the system through the messaging peers. When there is a status change in backend storage, both of the management stacks are notified, and both update their respective copy of the management database. A dedicated working thread manages synchronization between the two database copies. When the active SP becomes unavailable (e.g., by failure, intentional shutdown, etc.), the standby SP can immediately take over the management control role and serve the management commands/requests from the external storage administrator, using its copy of the database.

More particularly, a data storage system is disclosed that includes an array of storage devices and first and second storage processors operatively coupled to the array of storage devices, the storage processors having respective interfaces for operative coupling to separate client computers generating storage I/O commands for processing by the data storage system, the storage processors also having respective interfaces for operative coupling to a storage administrator.

The storage processors execute computer program instructions to realize respective datapath components and respective first and second management components. The datapath components maintain logical storage objects being the target of the storage I/O commands and for which underlying data is stored on the array of storage devices. The management components are configured for operation in an active-standby fashion in which:

(1) the management components maintain respective separate copies of a management database storing information about the logical storage objects;

(2) the first management component as an active management component serves external requests from the storage administrator by accessing its respective copy of the management database; and (3) the second management component as a standby management component responds to non-availability of the first management component by becoming the active management component and serving subsequent external requests from the storage administrator by accessing its respective copy of the management database.

Because both SPs execute respective management components and maintain respective copies of the management database, when the active SP is shutdown or otherwise becomes unavailable, the standby SP can take over the management control role immediately. Failover takes only a limited time, e.g., as little as one second. In addition, the presence of two database copies in the system can ensure high availability and data integrity. The use of certain communication components also reduces the communication load between management components and data path container, which makes the dual-executing management components possible.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
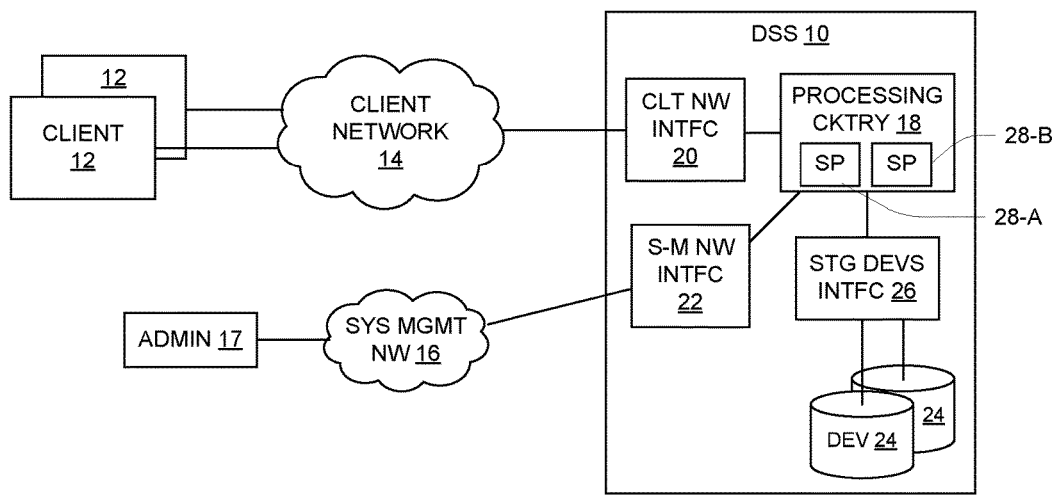
FIG. 1 is a block diagram of a data processing system.

FIG. 1 shows a data processing system including a data storage system (DSS) 10 connected to a set of client computers (CLIENT) 12 by a network shown as a client network 14, and also connected to a system management network (SYS MGMT NW) 16 to which a storage administrator (ADMIN) 17 is also connected. The data storage system 10 includes processing circuitry (CKTRY) 18, a client network interface (CLT NW INTFC) 20, a system management network interface (S-M NW INTFC) 22, secondary storage devices (DEV) 24 such as magnetic disk drives, Flash-based storage devices, etc., and storage device interface (STG DEVS INTFC) circuitry 26.

The network interfaces 20, 22 are specialized hardware components that translate between an internal data bus (such as PCMCIA, for example) and the respective network 14, 16. The processing circuitry 18 includes two or more distinct processing complexes referred to as "storage processors" or SPs 28 (shown as 28-A and 28-B) that each execute computer program instructions to cause the data storage system 10 to operate in the manner described herein. Additional details are provided below.

The data storage system 10 provides remote (or distributed) data storage services to the clients 12 via the client network 14. In some embodiments, the data storage system 10 provides so-called network attached storage or NAS. In such a case the client network 14 is typically a TCP/IP network, and the data storage system 10 presents one or more user-level file systems to the clients 12. Either alternatively or in addition, the data storage system 10 may provide storage in the form of block-structured logical storage devices, also referred to as "LUNs" or "volumes", and uses a suitable block-oriented protocol on the client network 14. In this case the client network 14 may again be a TCP/IP network with the block-oriented protocol (such as iSCSI) layered above the TCP/IP layer, or it may be realized as a so-called storage area network or SAN and utilize a native storage-oriented protocol such as FiberChannel. The system management network 16 is typically a TCP/IP network used for general network communications; in some embodiments there may be no separate system management network 16, in which case its connectivity and functionality may be provided by the client network 14.

The data storage system 10 also engages in system management operations, typically initiated by the storage administrator 17. These operations may use a Set/Get protocol, with Set operations being used to convey information (e.g. configuration information) from the storage administrator 17 to the data storage system 10, and Get operations being used to convey information from the data storage system 10 to the storage administrator 17. As explained more below, at any given time one of the SPs 28 is an "active" SP that interacts with the storage administrator 17, which the other(s) are "standby" SP(s) that maintain a level of readiness to assume the active role if something should happen to the currently active SP 28.

Figure 2:
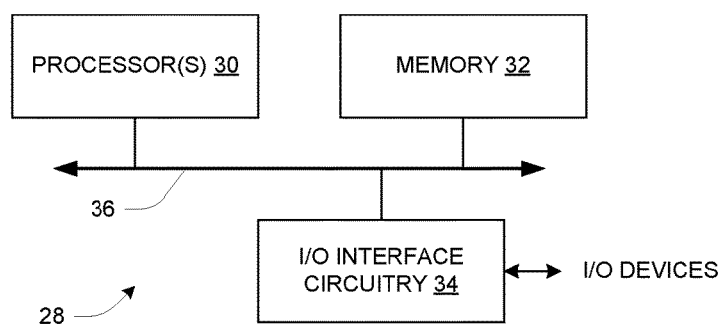
FIG. 2 is a block diagram of a storage processor from a hardware perspective.

FIG. 2 shows the general structure of an SP 28. Each SP 28 includes one or more processors 30, memory 32, and I/O interface circuitry 34 interconnected by data interconnections 36 such as one or more high-speed data buses, where the I/O interface circuitry 34 provides hardware connections to the various interfaces 20, 22, 26 (FIG. 1). In operation, the memory 32 of each of the SPs 28 stores data and instructions of system software (e.g., operating system) and one or more application programs which are executed to cause the data storage system 10 to function in a software-defined manner. In particular, the various functionality of the data storage system 10 described herein may be realized by the SPs 28 executing such system software and application program(s).

Figure 3:
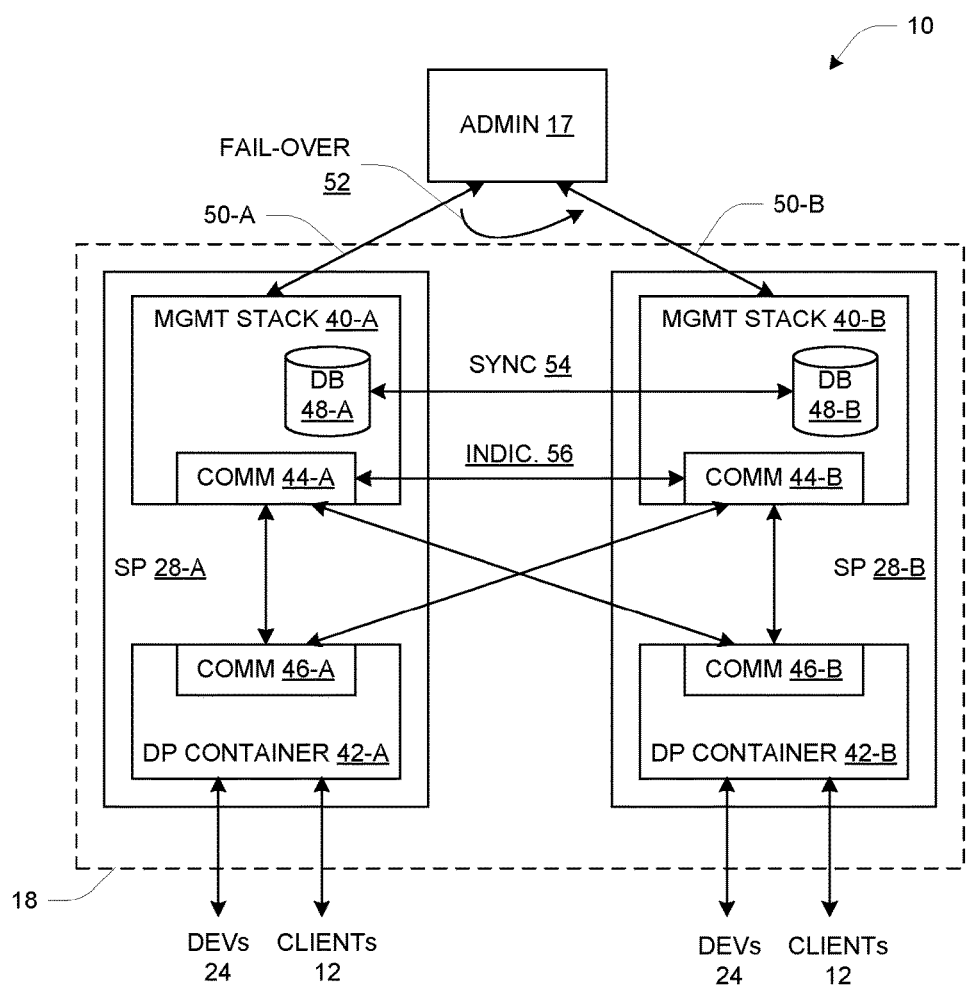
FIG. 3 is a functional block diagram of a data storage system.

FIG. 3 illustrates functional organization of the data storage system 10, in particular that of the two SPs 28. Each SP 28 has respective instances, identified by the suffix -A or -B, of the following components:

1. Management (MGMT) stack 40, also referred to herein as a "management component"
2. Datapath (DP) container 42
3. Communication components (COMM) 44, 46
4. Management database (DB) 48

The primary data storage functionality is provided by software executing in each of the datapath containers 42. Functionality may be divided between a front end, a device cache, and a back end (not separately shown). The front end provides desired interface(s) to the network clients 12, and may support a block-based communications protocol such as iSCSI or a NAS protocol such as CIFS. The front end uses internal mechanisms to realize the underlying storage functionality. One of the internal mechanisms may be the device cache, which caches data of underlying storage devices 24 accessed via the back end to make the data more quickly available, increasing performance. The back end interfaces to the storage devices 24.

In operation, the components of the datapath container 42 maintain a large quantity of information about the structure, configuration, and utilization of logical and physical storage resources, where "logical" resources can include things like LUNs, pools (internal devices that provides units of storage to constitute logical storage objects), file systems, volumes, etc. The management stack 40 is provided to enable the storage administrator 17 to view such management information as well as to perform management-related operations such as establishing and configuring units of logical storage, enabling extended services such as storage tiering, data deduplication, etc. To that end, the management stack 40 maintains the database 48 that contains management information obtained from the datapath containers 42 of both SPs 28. In operation, the storage administrator 17 provides and obtains management information to/from the database 48, and the management stack 40 populates the database 48 with data from the datapath containers 42 and communicates configuration and other data to the datapath containers 42 based on information written into the database 48 by the storage administrator 17.

Also shown in FIG. 3 are respective logical connections 50-A, 50-B between the storage administrator 17 and the respective SPs 28-A, 28-B. Only one of these is active at a given time, namely the one for the "active" SP 28 as opposed to the other, "standby" SP 28. In the event of a failover, the system switches to using the connection 50 to the formerly standby SP 28, which has become the active SP due to the failover. This is indicated by the arrow 52, for the case of failover from SP 28-A to SP 28-B. A failover in the opposite direction may also occur. Also shown are a synchronization (SYNC) connection 54 between the databases 48-A and 48-B, as well as a channel for an indication (INDIC.) 56 between the communication components 44-A and 44-B. These are used as described below.

In operation, both of the SPs 28 maintain their respective database copies 48-A, 48-B, but at any given time only one SP 28 functions as the "active" SP for purposes of system management, while the other(s) are "standby" SPs for such purposes. The active SP 28 is responsible for active communications with the storage administrator 17, responding to commands by returning or receiving system management information to/from its copy of the database 48. The system may employ a scheme for selecting one of the SPs 28 as active at a time of startup, which may be based on the values of internal SP identifiers for example. If an active SP 28 become unavailable, for example due to hardware failure, a standby SP 28 assumes the active role, i.e., it becomes the active SP 28 responsible for communicating with the storage administrator 17. As noted above, because each SP 28 maintains its own current database copy 48, the failover from one SP 28 to another can occur very quickly, minimizing the duration of the blackout period.

One aspect of operation is the use of "job" or "task" objects in connection with multi-step operations. The storage administrator 17 may send a specialized job/task object to the data storage system 10 that includes rules and logic for a particular multi-step operation, such as creating a file system for example. The job/task object is stored in the database 48 and becomes queued for execution by a task execution thread of an SP 28. Once the job/task is completed, the object is removed and a completion notification is returned to the storage administrator 17.

More specific aspects of operation are described below. It will be appreciated that not all specifics may occur in all embodiments.

1. System Startup:

The management stack 40 on each SP 28 subscribes to communication component 46 in both the local (same-SP) datapath container 42 and the peer (other-SP) datapath container 42. In addition, the communication components 44 in the management stacks 40 subscribe to each other to enable communications for synchronizing the database copies 48 across the SPs. The term "subscribe" refers to registering to receive notification of events. The management stack 40 of the active SP 28 sends a 'full poll' request to communication component 46 in the local (same-SP) data path container 42, and the datapath container 42 collects all the management information and broadcasts it via its communication component 42. Both SPs 28 receive the poll result and update their respective database copies 48 accordingly. At this time, both database copies 48 should have the same data.

2. Set Path Request:

The storage administrator 17 sends a create TUN' command to active SP 28, and the management stack 40 on the active SP 28 routes the request to the appropriate data path container 42 using the communication components 44, 46. The datapath container 42 creates the backend LUN and issues a 'new LUN' indication message using indication connection 56. The management stack 40 on both SPs receives the indication, constructs proper logical objects through the related business logic, and saves the logical objects in the respective local database copy 48. The management stack 40 on the active SP 28 also sends the response indicating completion of this command to the storage administrator 17.

3. Get Path Request:

The storage administrator 17 sends a query to the active SP 28. The management stack 40 of that SP 28 routes the request to the local database copy 48, constructs one or more response objects from data extracted from the database 48, and sends a response containing the response object(s) to the storage administrator 17.

4. Indication:

Whenever there is a status change of a backend storage object (LUN), the responsible datapath container 42 broadcasts an indication message, and the management stack 40 on each SP 28 receives the message and updates the local database 48. The management stack 40 on the active SP 28 also publishes the status change to any connected clients 12 via the client network 14 (FIG. 1).

5. Database Synchronization:

Job and task logical objects exist only in the management stack 40. Whenever there is a new job created, the active SP 28 sends an indication to the peer/standby SP 28 through the communication modules 44. The management stack 40 on the standby SP 28 receives the message and saves the job information into the local database 48.

A monitoring thread may also be used to periodically synchronize the two database copies 48 across the SPs 28 to ensure the data integrity.

6. Failover:

The management stacks 40 periodically communicate with each other to provide notifications of health and availability. A standby SP 28 continues operating as a standby SP 28 as long as it receives such communications from the active SP 28. If such communication cease, or more generally a standby SP 28 somehow becomes aware that the active SP 28 has become unavailable, the standby SP 28 switches operation to become the active SP. This may include initial communication with the storage administrator 17 for notification purposes. The storage administrator 17 subsequently issues system management commands to the newly active SP 28, which processes them and responds to the storage administrator 17 in the manner described above.

Figure 4:
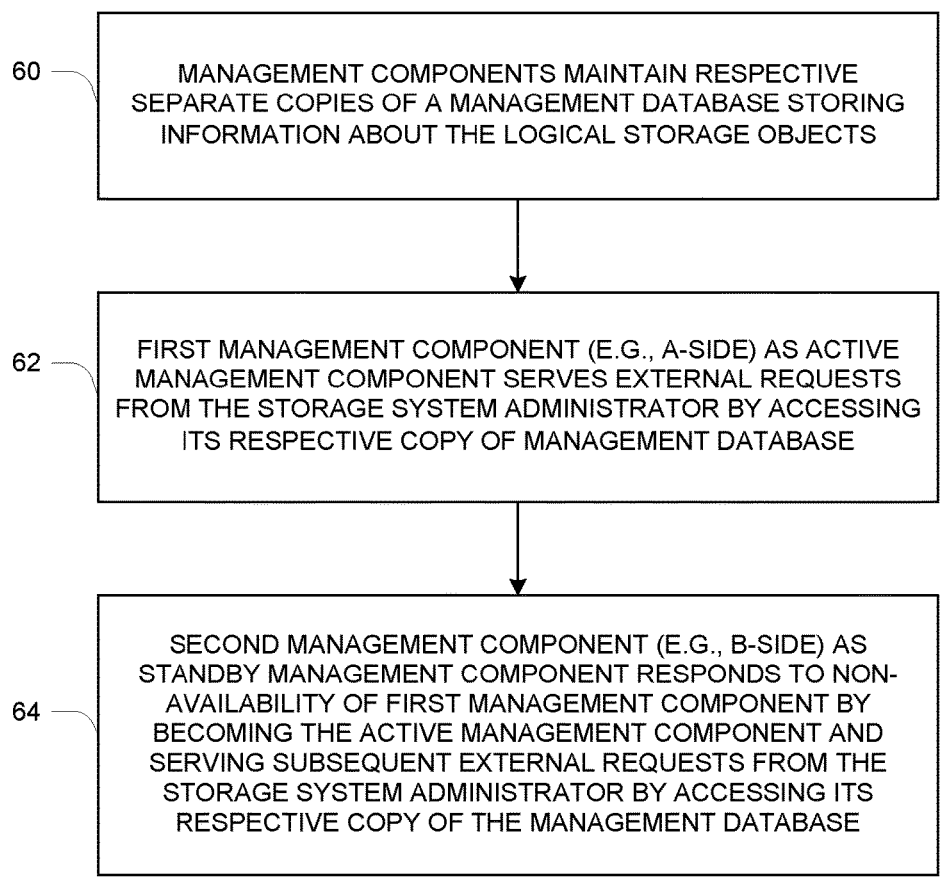
FIG. 4 is a flow diagram for high-level operation of a data storage system.

FIG. 4 illustrates key operation of the data storage system 10, specifically operation of the management components 40 of the SPs 28. As noted, datapath components (e.g., 42) maintain logical storage objects that are the target of the storage I/O commands and for which the underlying data is stored on the storage devices 24.

At 60, the management components (e.g., 40-A, 40-B) maintain respective separate copies (e.g., 48-A, 48-B) of a management database storing information about the logical storage objects.

At 62, a first management component (e.g., 40-A) as an active management component serves external requests from the storage administrator by accessing its respective copy (e.g., 48-A) of the management database.

At 64, a second management component (e.g., 40-B) as a standby management component responds to non-availability of the first management component by becoming the active management component and serving subsequent external requests from the storage administrator by accessing its respective copy (e.g., 48-B) of the management database.

While the above focuses on speeding failover, there may be other benefits to maintaining current copies of the management database 48 at multiple SPs 28. As an example, there may be a data integrity benefit. If the database 48 on one management component 40 becomes corrupted, it can automatically recover from the failure by re-synchronizing with the database 48 on another management component 40.

While various embodiments of the invention have been particularly shown and described, it will be understood by those skilled in the art that various changes in form and details may be made therein without departing from the spirit and scope of the invention as defined by the appended claims.

What is claimed is:

1. A data storage system, comprising
an array of storage devices; and
first and second storage processors operatively coupled to the array of storage devices and having respective interfaces for operative coupling to separate client computers generating storage I/O commands for processing by the data storage system, the storage processors also having respective interfaces for operative coupling to a storage administrator;
wherein the storage processors execute computer program instructions to realize respective datapath components and respective first and second management components, the datapath components maintaining logical storage objects being the target of the storage I/O commands and for which underlying data is stored on the array of storage devices, the management components being configured for operation in an active-standby fashion in which (1) the management components maintain respective separate copies of a management database storing information about the logical storage objects, (2) the first management component as an active management component serves external requests from the storage administrator by accessing its respective copy of the management database, and (3) the second management component as a standby management component responds to non-availability of the first management component by becoming the active management component and serving subsequent external requests from the storage administrator by accessing its respective copy of the management database, wherein (a) the management components periodically communicate with each other to provide notifications of health and availability, (b) the standby management component continues operating as a standby management component as long as it receives the notifications of health and availability from the active management component, and (c) in the event that the notifications from the active management component stop, the standby management component switches operation to become the active management component, subsequently receiving and processing system management commands from the storage administrator and sending responses to the storage administrator accordingly.

2. The data storage system of claim 1, wherein the datapath components have respective event-driven communication components for communicating information outside the datapath components, and wherein the management components of the storage processors subscribe to communications from the respective communication components of the datapath components to enable communications for synchronizing the copies of the database across the storage processors.

3. The data storage system of claim 2, wherein, at startup time, (1) the active management component sends a full poll request to the communication component in a respective datapath component, (2) the datapath component collects a full set of management information and broadcasts the full set of management information as a poll result via the communication component, (3) both management components receive the poll result and update their respective database copies accordingly.

4. The data storage system of claim 1, wherein, in response to a set path request sent to the data storage system by the storage administrator, (1) the active management component routes the set path request to the appropriate datapath component using the communication components, (2) the datapath component creates a backend logical unit (LUN) and issues a new LUN indication message using an indication connection between the storage processors, (3) the management components on both storage processors (i) receive the LUN indication message, (ii) construct corresponding logical storage objects through related business logic, and (iii) saves the logical objects in the respective database copy, and (4) the active management component sends a response indicating completion of the set path request to the storage administrator.

5. The data storage system of claim 1, wherein, in response to a get path request sent to the data storage system by the storage administrator, the active management component (1) routes the get path request to the local database copy, (2) constructs one or more response objects from data extracted from the local database copy, and (3) sends a response containing the response object(s) to the storage administrator.

6. The data storage system of claim 1, wherein, upon occurrence of a status change of a backend storage object (LUN) of a respective datapath component, (1) the datapath component broadcasts an indication message identifying the status change, (2) the management component on each storage processor receives the indication message and updates the respective database copy, and (3) the management component on the active storage processor also publishes the status change to the client computers.

7. The data storage system of claim 1, wherein the administrator creates job or task logical objects for multi-step tasks and sends the job or task logical objects to the data storage system, and wherein, upon receiving a new job or task logical object from the storage administrator, (1) the active management component sends the new job or task logical object to the standby management component using the communication components, and (2) the standby management component receives the new job or task logical object and saves it into the respective database copy.

8. The data storage system of claim 1, wherein a monitoring thread is used to periodically synchronize the database copies across the storage processors to ensure the data integrity.

9. A method of operating a data storage system having an array of storage devices and first and second storage processors operatively coupled to the array of storage devices, the storage processors executing respective datapath components maintaining logical storage objects being the target of the storage I/O commands and for which underlying data is stored on the array of storage devices, the method including, by the storage processors, executing respective management components in an active-standby fashion in which (1) the management components maintain respective separate copies of a management database storing information about the logical storage objects, (2) the first management component as an active management component serves external requests from a storage administrator by accessing its respective copy of the management database, and (3) the second management component as a standby management component responds to non-availability of the first management component by becoming the active management component and serving subsequent external requests from the storage administrator by accessing its respective copy of the management database, wherein (a) the management components periodically communicate with each other to provide notifications of health and availability, (b) the standby management component continues operating as a standby management component as long as it receives the notifications of health and availability from the active management component, and (c) in the event that the notifications from the active management component stop, the standby management component switches operation to become the active management component, subsequently receiving and processing system management commands from the storage administrator and sending responses to the storage administrator accordingly.

10. The method of claim 9, wherein the datapath components have respective event-driven communication components for communicating information outside the datapath components, and wherein the management components of the storage processors subscribe to communications from the respective communication components of the datapath components to enable communications for synchronizing the copies of the database across the storage processors.

11. The method of claim 10, further including, at startup time, (1) the active management component sending a full poll request to the communication component in a respective datapath component, (2) the datapath component collecting a full set of management information and broadcasting the full set of management information as a poll result via the communication component, (3) both management components receiving the poll result and updating their respective database copies accordingly.

12. The method of claim 9, further including, in response to a set path request sent to the data storage system by the storage administrator, (1) the active management component routing the set path request to the appropriate datapath component using the communication components, (2) the datapath component creating a backend logical unit (LUN) and issuing a new LUN indication message using an indication connection between the storage processors, (3) the management components on both storage processors (i) receiving the LUN indication message, (ii) constructing corresponding logical storage objects through related business logic, and (iii) saving the logical objects in the respective database copy, and (4) the active management component sending a response indicating completion of the set path request to the storage administrator.

13. The method of claim 9, further including, in response to a get path request sent to the data storage system by the storage administrator, the active management component (1) routing the get path request to the local database copy, (2) constructing one or more response objects from data extracted from the local database copy, and (3) sending a response containing the response object(s) to the storage administrator.

14. The method of claim 9, further including, upon occurrence of a status change of a backend storage object (LUN) of a respective datapath component, (1) the datapath component broadcasting an indication message identifying the status change, (2) the management component on each storage processor receiving the indication message and updating the respective database copy, and (3) the management component on the active storage processor also publishing the status change to the client computers.

15. The method of claim 9, wherein the administrator creates job or task logical objects for multi-step tasks and sends the job or task logical objects to the data storage system, and further including, upon receiving a new job or task logical object from the storage administrator, (1) the active management component sending the new job or task logical object to the standby management component using the communication components, and (2) the standby management component receiving the new job or task logical object and saves it into the respective database copy.

16. The method of claim 9, wherein a monitoring thread is used to periodically synchronize the database copies across the storage processors to ensure the data integrity.

* * * * *